US011334416B2

(12) United States Patent
Butcher et al.

(10) Patent No.: US 11,334,416 B2
(45) Date of Patent: May 17, 2022

(54) SYSTEM AND METHOD FOR TRANSFERRING PERIPHERAL FIRMWARE CORE DATA

(71) Applicant: DELL PRODUCTS, LP, Round Rock, TX (US)

(72) Inventors: Andrew Butcher, Cedar Park, TX (US); Lee Eric Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 16/663,946

(22) Filed: Oct. 25, 2019

(65) Prior Publication Data

US 2021/0124636 A1 Apr. 29, 2021

(51) Int. Cl.
*G06F 11/00* (2006.01)
*G06F 11/07* (2006.01)
*G06F 11/20* (2006.01)
*G06F 11/30* (2006.01)

(52) U.S. Cl.
CPC ...... *G06F 11/0778* (2013.01); *G06F 11/2025* (2013.01); *G06F 11/3006* (2013.01); *G06F 11/3037* (2013.01); *G06F 11/3051* (2013.01)

(58) Field of Classification Search
CPC ............. G06F 11/0778; G06F 11/2025; G06F 11/3037; G06F 11/3051; G06F 11/3006
See application file for complete search history.

(56) References Cited

U.S. PATENT DOCUMENTS

| | | | | |
|---|---|---|---|---|
| 9,940,143 | B2* | 4/2018 | Kumar | G06F 9/4416 |
| 10,649,832 | B2* | 5/2020 | Wszolek | G06F 11/0778 |
| 10,891,226 | B1* | 1/2021 | Leedham | G06F 12/0246 |
| 2008/0282117 | A1* | 11/2008 | Partani | H04L 12/12 714/48 |
| 2012/0047309 | A1* | 2/2012 | Natu | G06F 21/85 710/314 |
| 2012/0137180 | A1* | 5/2012 | Shao | G06F 11/0766 714/37 |
| 2012/0304019 | A1* | 11/2012 | Li | G06F 11/0778 714/45 |

(Continued)

OTHER PUBLICATIONS

Appendix 1 to the Oct. 2019 Update: Subject Matter Eligibility (Year: 2019).*

*Primary Examiner* — Jonathan D Gibson
(74) *Attorney, Agent, or Firm* — Larson Newman, LLP (57) ABSTRACT

An information handling system includes a first memory to store firmware core data for a peripheral device. A second memory includes a video framebuffer portion and a firmware core data portion. In response to a firmware exception within the peripheral device, the second memory receives the firmware core data. A baseboard management controller communicates with the peripheral device and with the second memory. The baseboard management controller queries the peripheral device for firmware storage capabilities of the peripheral device, and notifies a user of the information handling system that a firmware crash of the peripheral device has occurred. In response to the firmware crash of the peripheral device, the baseboard management controller receives the firmware core data from the peripheral device.

18 Claims, 5 Drawing Sheets

(56) References Cited

U.S. PATENT DOCUMENTS

2014/0281070 A1* 9/2014 Natu .................. G06F 12/06
 710/105
2016/0127171 A1* 5/2016 Kutch ................ H04L 41/069
 709/223
2016/0203159 A1 7/2016 Tran
2016/0323148 A1* 11/2016 Butcher .............. H04L 41/04
2017/0269943 A1* 9/2017 Kumar ................ G06F 9/4411
2018/0322016 A1 11/2018 Debata et al.
2019/0057000 A1* 2/2019 Wszolek ............ G06F 11/0772

* cited by examiner

SYSTEM AND METHOD FOR TRANSFERRING PERIPHERAL FIRMWARE CORE DATA

FIELD OF THE DISCLOSURE

The present disclosure generally relates to information handling systems, and more particularly relates to transferring peripheral firmware core data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes a peripheral device having a first memory to store firmware core data for the peripheral device. A second memory includes a video framebuffer portion and a firmware core data portion. In response to a firmware exception within the peripheral device, the second memory receives the firmware core data. A baseboard management controller queries the peripheral device for firmware storage capabilities of the peripheral device, and notifies a user of the information handling system that a firmware crash of the peripheral device has occurred. In response to the firmware crash of the peripheral device, the baseboard management controller receives the firmware core data from the peripheral device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
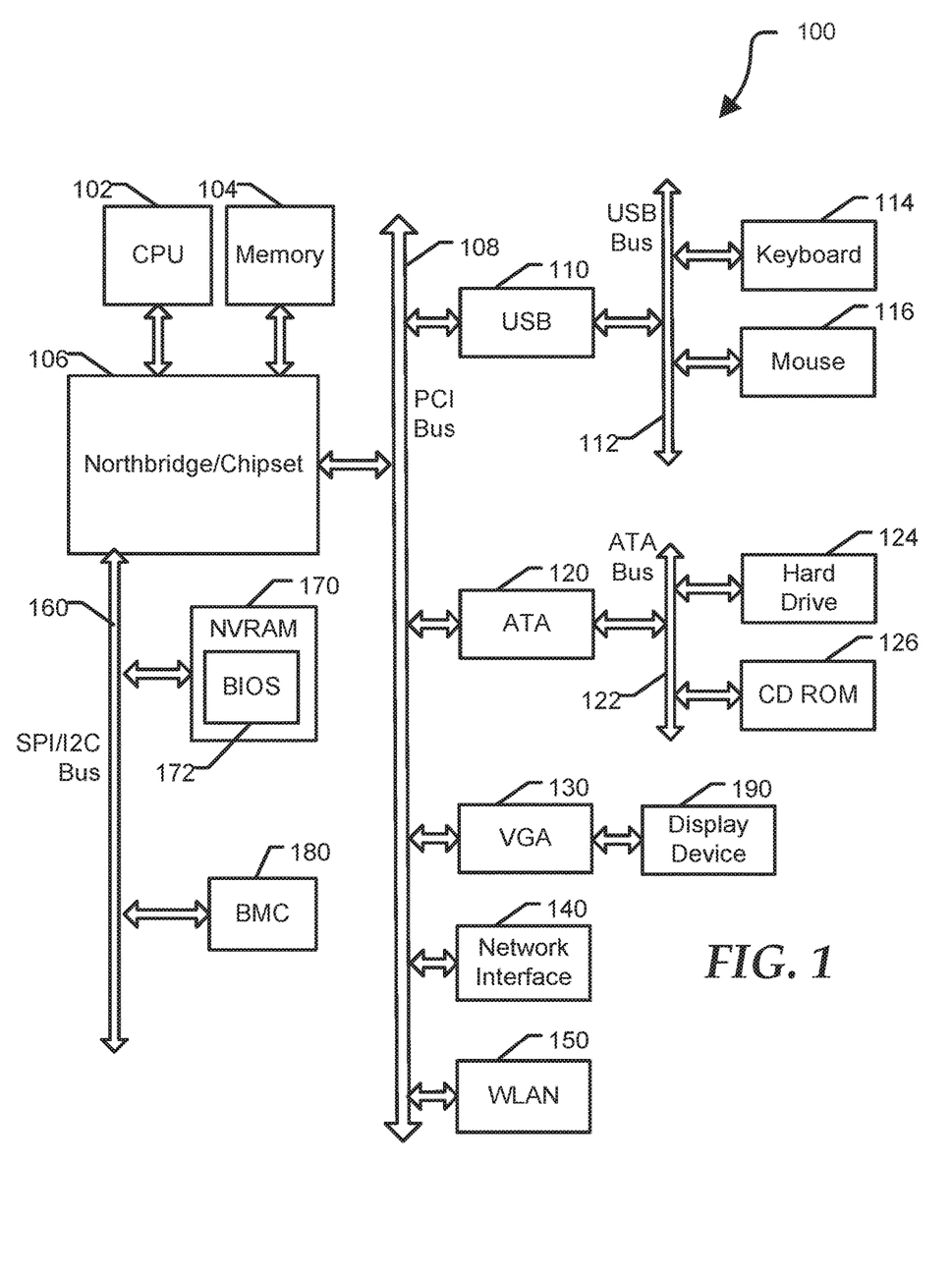
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
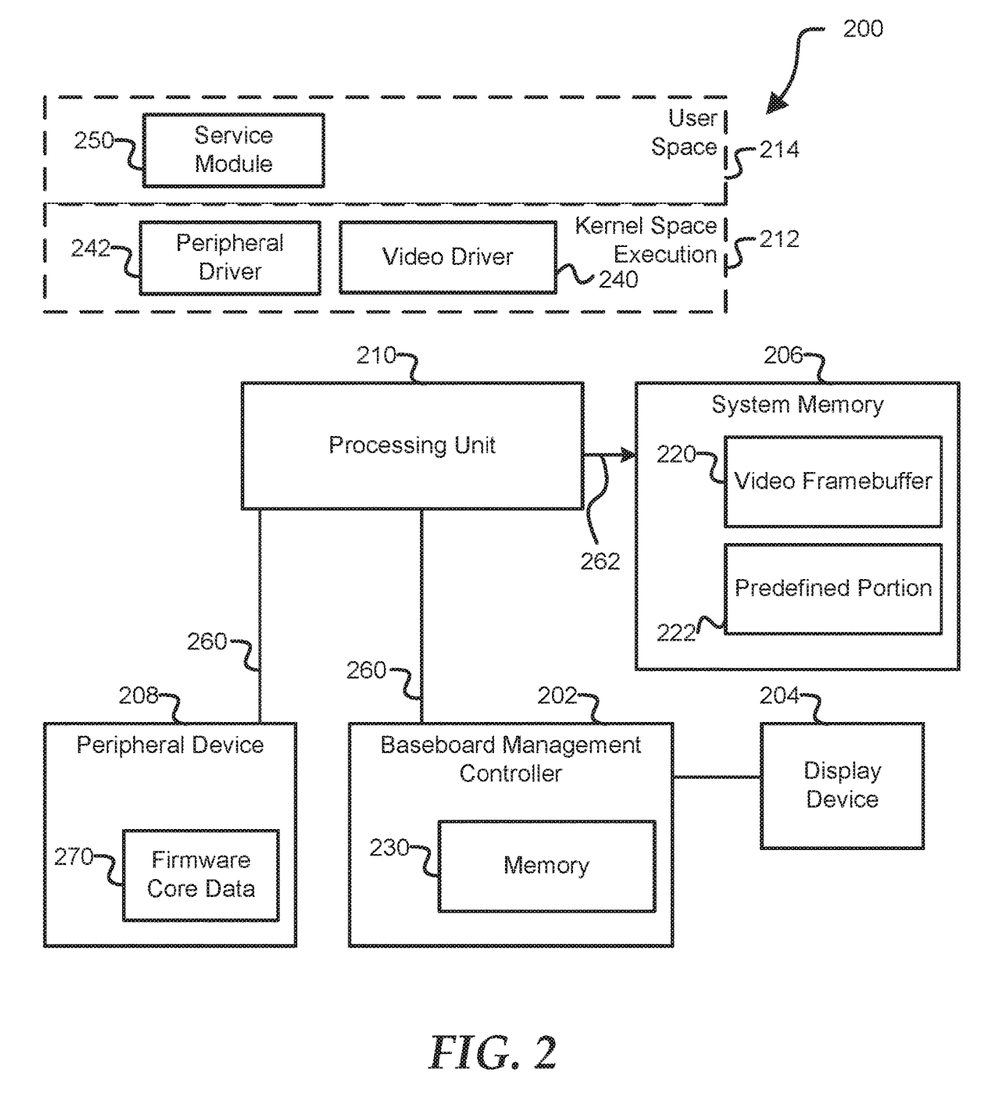
FIG. 2 is a block diagram of a portion of an information handling system for transferring firmware code data from a peripheral device to a baseboard management controller according to at least one embodiment of the disclosure.

FIG. 2 shows a portion of an information handling system 200 for transferring firmware core data from a peripheral device to a baseboard management controller. Information handling system 200 includes a baseboard management controller (BMC) 202, a display device 204, a system memory 206, a peripheral device 208, and a central processing unit (CPU) 210, a kernel space 212, and a user space 214. System memory 206 includes a video framebuffer 220 and a predefined portion 222. In an example, kernel space 212 and user space 214 may be executed by one or more processing units with information handling system 200, such as CPU 210. In an example, BMC 202 may include a memory 230. Kernel space 212 may include one or more drivers including, but not limited to, video driver 240 and a peripheral driver 242. User space 214 may include a service module 250.

Information handling system 200 may be employed, in whole or in part, by information handling system 100 illustrated in FIG. 1, or any other system, device, component, etc. operable to employ portions, or all of, the information handling system. In an example, BMC 202 may be any suitable type of controller, such as a BMC in accordance with an IPMI specification, an Integrated Dell Remote Access Controller (iDRAC), or the like. Peripheral device 208 may be any suitable type of device including, but not limited to, an input/output (IO) adapter, such as a network interface card (NIC). Peripheral driver 242 may be any suitable driver to enable processing unit 210 to communicate with peripheral device 208. For example, if peripheral device 208 is a NIC, peripheral driver 242 may be a NIC driver. In an example, service module 250 may be any suitable hardware or firmware to interface with BMC 202 including, but not limited to, an iDRAC service module (ISM). In certain examples, communication of data within information handling system may be via multiple communication channels, such as communication channels 260 and 262. In an embodiment, communication channels 260 are PCIe communication channels and communication channel 262 is a DDR4 communication channel.

During operation, firmware core data 270 of peripheral device 208 may be updated continuously based on a current state of the peripheral device. Thus, firmware core data 270 may be complex and stateful based on remote direct memory access (RDMA), encryption, Open Virtual Switch (OVS) offloads, management data, or the like. Therefore, if a firmware exception, such as a core dump or trapped event, occurs within peripheral device 208, as much of firmware core data 270 as possible should be captured and stored. However, when a firmware exception occurs, peripheral device 208 may be in a highly degraded state, such that the peripheral device may only be able to DMA firmware core data 270 to system memory 206. In an example, system memory 206 may be a volatile memory, such that if information handling system 200 is rebooted while firmware core data 270 is stored within the system memory, the firmware core data may be lost. Therefore, BMC 202 may improve information handling system 200 by providing a mechanism for transferring firmware core data 270 from peripheral device 208 to a non-volatile memory, such as memory 230 of the BMC, and as a result the firmware core data may be retained even if the information handling system is rebooted.

In an example, BMC 202 may perform one or more operations to determine firmware core dump capabilities of peripheral device 208 and to setup a storage location within system memory 206 for firmware core data 270. For example, BMC 202 may query peripheral device 208 to determine firmware core data dump capabilities of the peripheral device. In certain examples, BMC 202 may set a location for firmware core data 270 to be stored within system memory 206 if a firmware exception occurs within peripheral device 208. For example, BMC 202 may set any suitable location within system memory 206 as the location for firmware core data 270 including, but not limited to, video framebuffer 220 and predefined portion 222. In an example, BMC 202 may reserve, via video driver 240, a portion of video framebuffer 220 for storage of firmware core data 270. In an example, the core dump capability of peripheral device 208 may be discovered and configured via a sideband mechanism between BMC 202 and the peripheral device.

In response to a firmware exception, peripheral device 208 may perform one or more operations to execute firmware dump. For example, peripheral device 208 may either provide firmware core data 270 to BMC 202 or provide the firmware core data to system memory 206. In an example, if capable, peripheral device 208 may transfer firmware core data 270 to BMC 202 via any suitable transfer protocol including, but not limited to, a Reduced Media Independent Interface (RMII) Based Transport (RBT) and a PCIe Vendor Defined Message (VDM). In certain examples, the data transfer from peripheral device 208 to BMC 202 may utilize a root complex of processing unit 210 and communication channels 260.

However, if peripheral device 208 is not capable of providing firmware core data 270 to BMC 202, the firmware core data may be transfer to system memory 206. In an example, firmware core data 270 may be transferred in any suitable manner including, but not limited to, a direct memory access (DMA) transfer to predefined portion 222 of system memory 206 via the root complex of processing unit 210. In certain examples, peripheral driver 242 may implement the firmware core data transfer from peripheral device 208 to system memory 206.

In an example, transfer of firmware core data 270 from system memory 206 to BMC 202 may be performed in any suitable manner. For example, processing unit 210 may execute code associated with either video driver 240 or service module 250 to handle the data transfer. In response to service module 250 being available, the service module may be registered with peripheral device 208 to receive health events associated with the peripheral device. In certain examples, service module 250 may register with peripheral device 208 via any suitable protocol including, but not limited to, Netlink and inter-process communication (IPC). In an example, health events for peripheral device 208 may include any suitable event within the peripheral device including, but not limited to, a firmware exception, such as firmware crash, within the peripheral device.

In response to service module 250 detecting the firmware exception, the service module may determine to transfer firmware core data 270 system memory 206 to BMC 202. In an example, firmware core data 270 may be transferred to BMC 202 by any suitable mechanism and/or protocol. For example, the data transfer may be made via a USB NIC OSBMC path through kernel space 212.

In an example, service module 250 may also indicate to BMC 202 that the firmware exception has occurred, and the BMC may perform one or more operations to notify the user of the firmware exception. In certain examples, BMC 202 may provide firmware core data 270 to the user of information handling system 200, to a support team for the information handling system, or the like. Additionally, BMC 202 may provide a notification of the firmware exception to the user of information handling system 200 via a notification message on display device 204. In an example, the notification of the peripheral firmware exception may be provided via an out-of-band communication.

In an example, if service module 250 is not available, system memory 206 may be monitored for a firmware core data dump. In an example, system memory 206 may be monitored by any suitable kernel module within kernel space 212 of information handling system 200. For example, video driver 240 with user space 214 may monitor system memory 206 for a firmware core data dump. In an example, firmware core data 270 may be stored in predefined portion 222 of system memory 206. In response firmware core data 270 being stored in predefined portion 222 of system memory 206, video driver 240 may copy the firmware core data from the predefined portion to video framebuffer 220. Video driver 240 may indicate to BMC 202 that firmware core data 270 is to be transferred to memory 230. In an example, firmware core data 270 may be read from video framebuffer 220 by BMC 202 and stored in memory 230. In an example, firmware core data 270 may be delivered from video framebuffer 220 to BMC 202 via video driver 240. Thus, information handling system 200 includes one or more mechanism to transfer firmware core data 270 to a non-volatile memory and notifying a user via display device 204 when a firmware exception occurs within peripheral device 208. The data transfer improves information handling system 200 by ensuring that firmware core data 270 is saved even if a reboot of the information handling system occurs.

Figure 3:
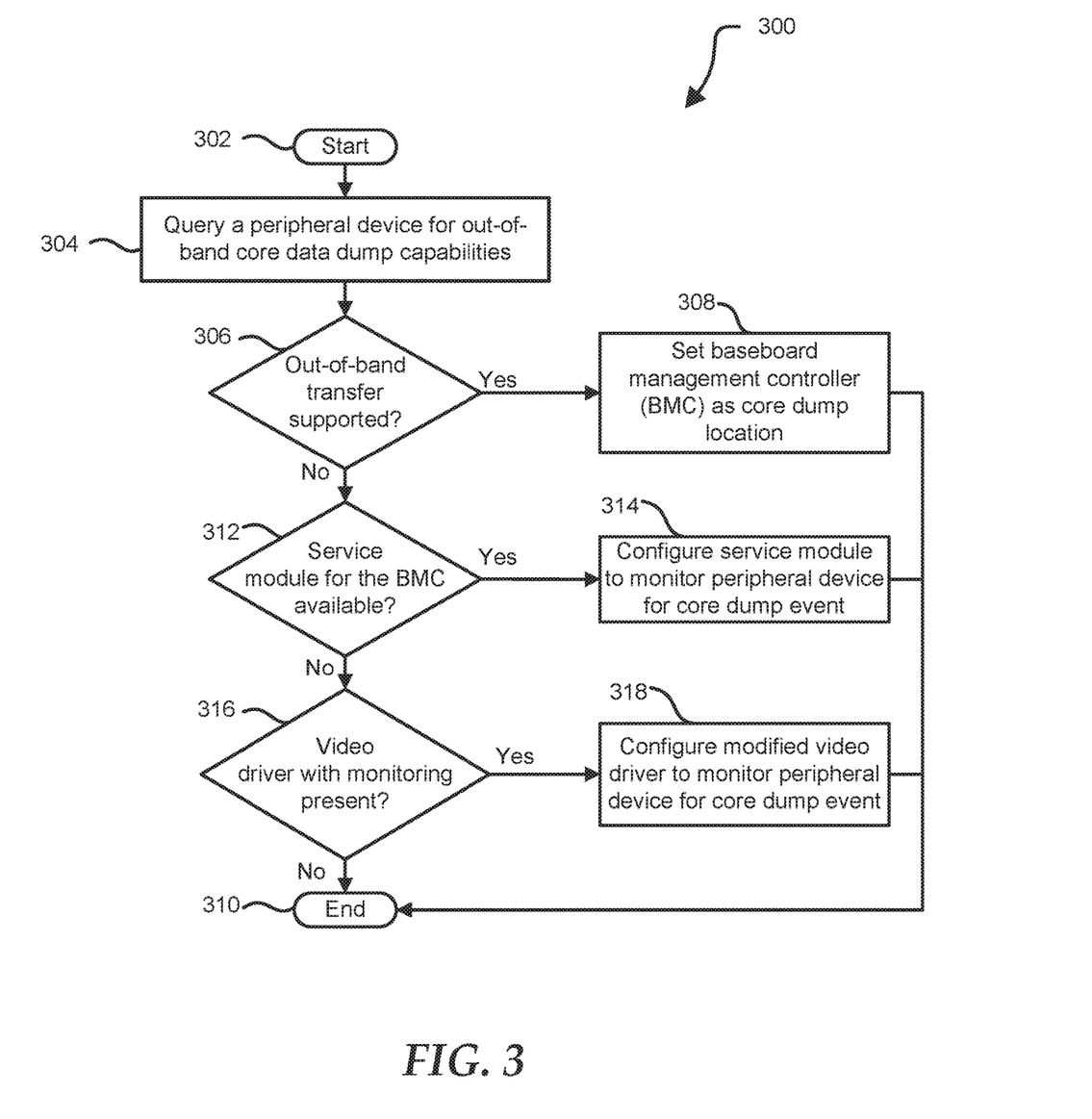
FIG. 3 is a flow diagram illustrating a method for configuring a core dump location or monitoring agent of a peripheral device within an information handling system according to at least one embodiment of the disclosure.

FIG. 3 shows a method 300 for configuring a core dump location or monitoring agent of a peripheral device within an information handling system, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 3.

At block 304, a peripheral device is queried for out-of-band (OOB) core data dump capabilities. In an example, the peripheral device may be any suitable type of device including, but not limited to, a network interface card (NIC) and a Peripheral Component Interconnect-Express (PCIe) card. In certain examples, a baseboard management controller (BMC) of the information handling system may query the peripheral device. In an example, the BMC may be any suitable type of controller, such as a BMC in accordance with an IPMI specification, an Integrated Dell Remote Access Controller (iDRAC), or the like.

At block 306, a determination is made whether an OOB transfer is supported. For example, the OOB transfer may be performed in any suitable manner including, but not limited to, via a root complex of the processing unit and PCIe communication channels between the processing device and both of the peripheral device and the BMC. In an example, the transfer may be made via any suitable transfer protocol including, but not limited to, a Reduced Media Independent Interface (RMII) Based Transport (RBT) and a PCIe VDM. If the OOB transfer is supported, the BMC is set as a core data file dump location at block 308, and the method ends at block 310.

However, if the OOB transfer is not supported, a determination is made whether a service module for the BMC is available at block 312. In an example, the service module may be any suitable hardware or software module including, but not limited to, an iDRAC service module (ISM). If the service module for the BMC is available, the service module is configured to monitor the peripheral device for a core data file dump event at block 314, and the method ends at block 310. However, if the service module is not available, a determination is made whether a video driver with a monitoring capability is present at block 316. If the service module is not available, the method ends at block 310. If the service module is available, a modified video driver is configured to monitor the peripheral device for a core data file dump event at block 318, and the method ends at block 310.

Figure 4:
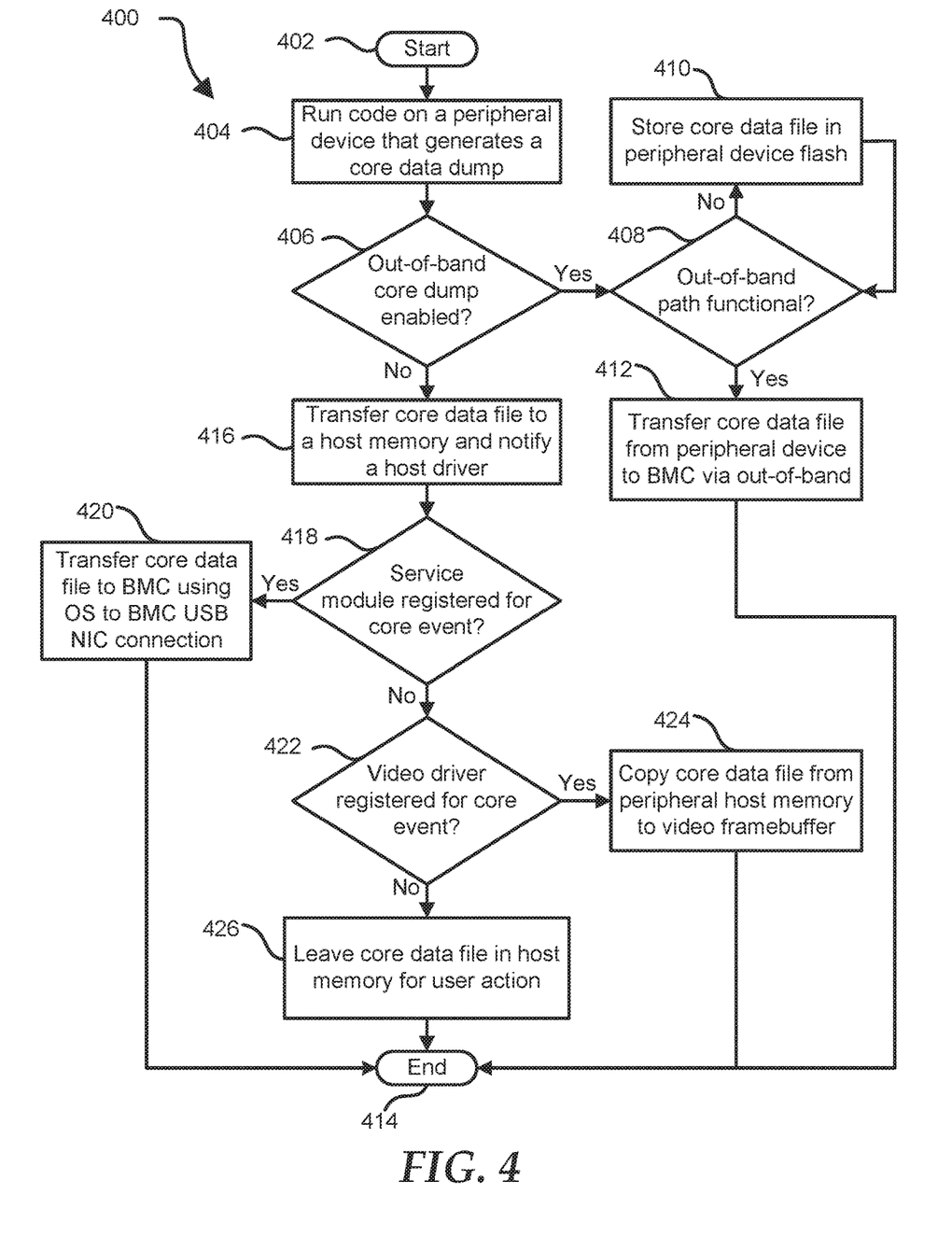
FIG. 4 is a flow diagram illustrating a method for transferring a firmware core data file from a peripheral device to a baseboard management controller of an information handling system according to at least one embodiment of the disclosure.

FIG. 4 shows a method 400 for transferring a firmware core data file from a peripheral device to a baseboard management controller of an information handling system, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 4.

At block 404, code on a peripheral device is run that generates a core data file dump. At block 406, a determination is made whether an OOB core data file dump is enabled at block 406. If the OOB core data file dump is enabled, a determination is made whether an OOB path is functional at block 408. If the OOB path is not functional, the core data file is stored in the peripheral device at block 410, and the flow continues at block 408. If the OOB path is functional, the core data file is transferred from the peripheral device to the BMC via an OOB communication path at block 412, and the method ends at block 414. In an example, the OOB may transfer may be performed in any suitable manner including, but not limited to, via a root complex of the processing unit and PCIe communication channels between the processing device and both of the peripheral device and the BMC. In an example, the transfer may be made via any suitable transfer protocol including, but not limited to, a Reduced Media Independent Interface (RMII) Based Transport (RBT) and a PCIe VDM.

If at block 406, the OOB core data file dump is not enabled, the core data file is transferred to a host memory and a host driver is notified of the transfer at block 416. In an example, the core data file may be transferred via any suitable manner including, but not limited to, a direct memory access (DMA) transfer from the peripheral device to the dedicated memory location of the host memory.

At block 418, a determination is made whether a service module is registered for notifications of a core event. If the service module has registered, the core data file is transferred to the BMC via an OS to BMC connection at block 420, and the method ends at block 414. In an example, the firmware core data may be transferred to the BMC by any suitable mechanism and/or protocol. For example, the data transfer may be made via a USB NIC OSBMC path through a kernel of the processing unit.

If the service module has not registered, a determination is made whether a video driver has registered for core events at block 422. If a video driver has registered for a core event, the core data file is copied from the host memory to a video framebuffer at block 424, and the method ends at block 414. In an example, the core data file may be copied from a dedicated memory location of the host memory to a video framebuffer of the host memory. In certain examples, after the core data file is copied to the video framebuffer, the BMC may detect a modification to the video framebuffer and copy the core data file from the video framebuffer to a memory within the BMC. In an example, the operations of the BMC may be executed by any suitable device including, but not limited to, an integrated Kernel-based Virtual Machine (iKVM) without varying from the scope of the disclosure.

If the video driver has not registered for a core event, the core data file may be left in the host memory for user action at block 426, and the method ends at block 414. In an example, the core data file left in the dedicated location of the host memory may be lost if the information handling system is rebooted before the data is transferred to the BMC.

Figure 5:
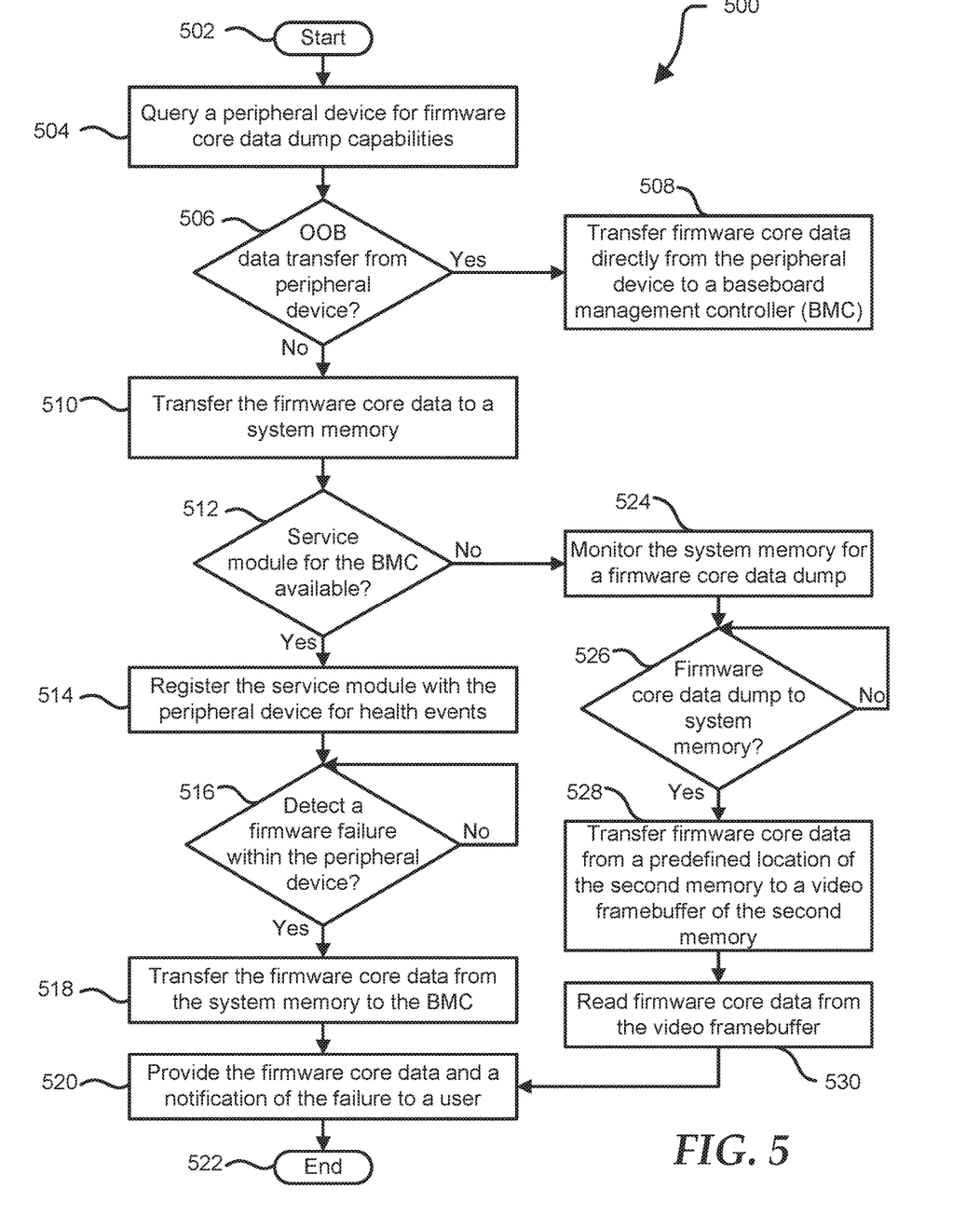
FIG. 5 is a flow diagram illustrating a method for transferring firmware code data from a peripheral device to a baseboard management controller of an information handling system according to at least one embodiment of the disclosure.

FIG. 5 shows a method 500 for transferring firmware core data from a peripheral device to a baseboard management controller of an information handling system, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 5.

At block 504, a peripheral device is queried to determine firmware core data dump capabilities of the peripheral device. In an example, the peripheral device may be any suitable type of device including, but not limited to, a network interface card (NIC) and a Peripheral Component Interconnect-Express (PCIe) card. In certain examples, a baseboard management controller (BMC) of the information handling system may query the peripheral device. In an example, the BMC may be any suitable type of controller, such as a BMC in accordance with an IPMI specification, an Integrated Dell Remote Access Controller (iDRAC), or the like. In certain examples, during the process of query of the peripheral device, the BMC may also set a location for firmware core data to be stored within a system memory if a firmware exception occurs within the peripheral device. For example, the BMC may set any suitable location within the system memory as the location for the firmware core data including, but not limited to, a predefined portion of the system memory and a video framebuffer. In an example, the BMC may reserve a portion of the video framebuffer via a video driver within a kernel space of a processing unit of the information handling system. In an example, the core dump capability of the peripheral device may be discovered and configured via a sideband mechanism between the BMC and the peripheral device.

At block 506, a determination is made whether a data transfer directly from the peripheral device to the BMC is capable. If the data transfer is capable, firmware core data is transferred from the peripheral device to the BMC at block 508. For example, the peripheral device may transfer the firmware core data to the BMC via a root complex of the processing unit and PCIe communication channels between the processing device and both of the peripheral device and the BMC. In an example, the transfer may be made via any suitable transfer protocol including, but not limited to, a Reduced Media Independent Interface (RMII) Based Transport (RBT) and a PCIe VDM.

In response to a determination that the direct data transfer is not capable, the firmware core data is transfer to the system memory at block 510. In an example, firmware core data may be transferred in any suitable manner including, but not limited to, a direct memory access (DMA) transfer to the system memory via the root complex of the processing unit. In certain examples, a driver, such as a peripheral device driver, within the kernel space of the processing unit may implement the firmware core data transfer from the peripheral device to the system memory. In an example, the firmware core data may be stored in any suitable location of the system memory including, but not limited to, the predefined portion of the system memory and the video framebuffer.

At block 512, a determination is made whether a service module for the BMC is available within the information handling system. In an example, the service module may be any suitable hardware or software module including, but not limited to, an iDRAC service module (ISM). In response to the service module being available, the service module is registered with the peripheral device to receive health events at block 514. In certain examples, the service module may register with the peripheral device via any suitable protocol including, but not limited to, netlink and IPC. In an example, health events for the peripheral device may include any suitable event within the peripheral device including, but not limited to, a firmware crash within the peripheral device.

At block 516, a determination is made whether a firmware exception within the peripheral device is detected. In an example, the service module may be provided with data indicating the firmware exception of the peripheral device in any suitable manner. In response to the detection of the firmware exception, the firmware core data is transferred from the system memory to the BMC at block 518. In an example, the firmware core data may be transferred to the BMC by any suitable mechanism and/or protocol. For example, the data transfer may be made via a USB NIC OSBMC path through a kernel of the processing unit.

At block 520, the firmware core data and a notification of the firmware exception is provided to a user of the information handling system and the method ends at block 522. In an example, the BMC may provide the firmware core data to the user in any suitable manner. In certain examples, the BMC may provide the notification of the firmware exception to the user via a display device. In an example, the notification of the peripheral firmware exception may be provided via an out-of-band communication.

If at block 512, the service module is not available, the system memory is monitored for a firmware core data dump at block 524. In an example, the system memory may be monitored by any suitable kernel module within the information handling system. For example, a video driver of the information handling system may monitor the system memory for firmware core data dump. At block 526, a determination is made whether a firmware core data dump to the system memory has occurred. In an example, the firmware core data may be stored in the predefined portion of the system memory.

In response to the occurrence of the firmware core data dump to the system memory, the video driver may copy the firmware core data from the predefined portion to the video framebuffer of the second memory at block 528. At block 530, the firmware core data may be read from the video framebuffer by the BMC. In an example, the firmware core data may be delivered from the video framebuffer to the BMC via the video driver. The method continues as stated above at block 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a peripheral device including a first memory device to store firmware core data for the peripheral device;
a second memory device including a video framebuffer portion and a firmware core data portion, the second memory device to receive the firmware core data in response to a firmware exception within the peripheral device; and
a baseboard management controller to communicate with the peripheral device and with the second memory device, the baseboard management controller including a third memory device discrete from the first and second memory devices, wherein the third memory device is a non-volatile memory device, the baseboard management controller to query the peripheral device for firmware storage capabilities of the peripheral device, to notify a user of the information handling system that a firmware crash of the peripheral device has occurred, and in response to the firmware crash of the peripheral device, to receive the firmware core data from the peripheral device and to store the firmware core data to the third memory device;
wherein the baseboard management controller queries the peripheral device for firmware storage capabilities of the peripheral device via a sideband communication, and wherein when the peripheral device enables sideband communication, the peripheral device is further to send the firmware core data to the baseboard management controller utilizing a PCIe Vendor Defined Message.

2. The information handling system of claim 1, further comprising:
a video driver to communicate with the second memory device and with the baseboard management controller, the video driver to read the firmware core data from the video framebuffer and to provide the firmware core data to the baseboard management controller.

3. The information handling system of claim 2, wherein the video driver further to monitor the second memory device for a storage of the firmware core data from the peripheral device to the second memory device, and in response to the storage of the firmware core data, to copy the firmware core data from the firmware core data portion to the video framebuffer of the second memory device.

4. The information handling system of claim 1, further comprising:
a service module to communicate with the second memory device and with the baseboard management controller, the service module to read the firmware core data from the firmware core data portion and to provide the firmware core data to the baseboard management controller.

5. The information handling system of claim 4, wherein the service module further to register with the peripheral device, to receive health data for the peripheral device, and to notify the baseboard management controller of a firmware exception of the peripheral device.

6. The information handling system of claim 1, wherein the baseboard management controller notify the user of the information handling system that the firmware crash of the peripheral device has occurred via an out-of-band communication.

7. A method, comprising:
detecting a firmware exception within a peripheral device of an information handling system;
querying, by a baseboard management controller, a first memory device of the peripheral device for firmware storage capabilities of the peripheral device;
notifying, by the baseboard management controller, a user of the information handling system that the firmware exception of the peripheral device has occurred, wherein the firmware exception is a firmware crash;
in response to the firmware exception of the peripheral device, receiving, by the baseboard management controller, the firmware core data from the peripheral device, and storing the firmware core data to a second memory device of the baseboard management controller, wherein the second memory device is a non-volatile memory device, and wherein the first memory device is discrete from the second memory device;
querying, by the baseboard management controller, the peripheral device for firmware storage capabilities of the peripheral device via a sideband communication; and sending, by the peripheral device, the firmware core data to the baseboard management controller utilizing a PCIe Vendor Defined Message when the peripheral device enables sideband communication.

8. The method of claim 7, the receiving of the firmware core data from the peripheral device further comprises:
reading, by a video driver, the firmware core data from the video framebuffer; and
providing, by the video driver, the firmware core data to the baseboard management controller.

9. The method of claim 8, further comprising:
monitoring, by the video driver, the second memory device for the storage of the firmware core data from the peripheral device to the second memory device; and
in response to the storage of the firmware core data, copying, by the video driver, the firmware core data from the firmware core data portion to the video framebuffer of the second memory device.

10. The method of claim 7, the receiving of the firmware core data from the peripheral device further comprises:
reading, by a service module, the firmware core data from the firmware core data portion; and
providing, by the service module, the firmware core data to the baseboard management controller.

11. The method of claim 10, further comprising:
registering, by the service module, with the peripheral device;
receiving, by the service module, health data for the peripheral device; and
notifying, by the service module, the baseboard management controller of a firmware exception of the peripheral device.

12. The method of claim 7, wherein the notifying of the firmware crash to the user of the information handling system by the baseboard management controller is via an out-of-band communication.

13. An information handling system, comprising:
a peripheral device including a first memory device to store firmware core data for the peripheral device;
a second memory device including a video framebuffer portion and a firmware core data portion, the second memory device to receive the firmware core data in response to a firmware exception within the peripheral device;
a processing unit to communicate with the peripheral device and with the second memory device, the processing unit to provide a direct memory access transfer of the firmware core data from the peripheral device to the firmware core data portion of the second memory device; and
a baseboard management controller to communicate with the peripheral device, with the processing unit, and with the second memory device, the baseboard management controller including a third memory device discrete from the first and second memory devices, wherein the third memory device is a non-volatile memory device, the baseboard management controller to query the peripheral device for firmware storage capabilities of the peripheral device, to notify a user of the information handling system that a firmware crash of the peripheral device has occurred, and in response to the firmware crash of the peripheral device, to receive the firmware core data from the peripheral device and to store the firmware core data to the third memory device;
wherein the baseboard management controller queries the peripheral device for firmware storage capabilities of the peripheral device via a sideband communication, and wherein when the peripheral device enables sideband communication, the peripheral device is further to send the firmware core data to the baseboard management controller utilizing a PCIe Vendor Defined Message.

14. The information handling system of claim 13, further comprising:
a video driver to communicate with the second memory device and with the baseboard management controller, the video driver to read the firmware core data from the video framebuffer and to provide the firmware core data to the baseboard management controller.

15. The information handling system of claim 14, wherein the video driver further to monitor the second memory device for a storage of the firmware core data from the peripheral device to the second memory device, and in response to the storage of the firmware core data, to copy the firmware core data from the firmware core data portion to the video framebuffer of the second memory device.

16. The information handling system of claim 13, further comprising:
a service module to communicate with the second memory device and with the baseboard management controller, the service module to read the firmware core data from the firmware core data portion and to provide the firmware core data to the baseboard management controller.

17. The information handling system of claim 16, wherein the service module further to register with the peripheral device, to receive health data for the peripheral device, and to notify the baseboard management controller of a firmware exception of the firmware of the peripheral device.

18. The information handling system of claim 1, wherein the baseboard management controller notify the user of the information handling system that the firmware crash of the peripheral device has occurred via an out-of-band communication.

* * * * *